(12) United States Patent
Aronson et al.

(10) Patent No.: US 6,700,970 B1
(45) Date of Patent: Mar. 2, 2004

(54) LAN PHONE SYSTEM WITH AUTOMATIC FALLBACK FOR POWER OR NETWORK FAILURE

(75) Inventors: Michael Aronson, Lexington, MA (US); Thomas Joseph Schmidt, Milford, NH (US)

(73) Assignee: AOX Incorporated, Bedford, MA (US)

(*) Notice: Subject to any disclaimer, the term of this patent is extended or adjusted under 35 U.S.C. 154(b) by 679 days.

(21) Appl. No.: 09/617,777

(22) Filed: Jul. 17, 2000

(51) Int. Cl.[7] .............................................. H04M 7/00
(52) U.S. Cl. ................................. 379/225; 379/395.01
(58) Field of Search ................................ 370/216, 217; 379/79, 167.13, 225, 232, 307, 322, 323, 395.01, 413

(56) References Cited

U.S. PATENT DOCUMENTS

| | | | |
|---|---|---|---|
| 3,927,272 A | * 12/1975 | Bloxham et al. ............ 379/193 |
| 4,575,584 A | 3/1986 | Smith et al. |
| 4,853,949 A | 8/1989 | Schorr et al. |
| 4,972,452 A | 11/1990 | Chack et al. |
| 5,097,528 A | 3/1992 | Gursahaney et al. |
| 5,142,571 A | 8/1992 | Suzuki et al. |
| 5,216,704 A | 6/1993 | Williams et al. |
| 5,598,401 A | 1/1997 | Blackwell et al. |
| 5,619,252 A | 4/1997 | Nakano |
| 5,627,827 A | 5/1997 | Dale et al. |
| 5,742,596 A | 4/1998 | Baratz et al. |
| 5,875,234 A | 2/1999 | Clayton et al. |
| 5,892,764 A | 4/1999 | Riemann et al. |
| 5,912,888 A | 6/1999 | Walsh et al. |
| 5,940,479 A | 8/1999 | Guy et al. |
| 5,943,404 A | 8/1999 | Sansom et al. |

OTHER PUBLICATIONS

US 201/0053125, Staples et al, Dec. 20, 2001 (Appl. 09/827,022 filed on Apr. 04, 2001), pp. 1–5.*

* cited by examiner

*Primary Examiner*—Bing Bui
(74) *Attorney, Agent, or Firm*—Venable, LLP; Ralph P. Albrecht (57) ABSTRACT

In a telephone system employing a PBX server to communicate with local telephones over a local area network, fallback adapters are provided to automatically respond to a power failure and also respond to the failure of the PBX server to automatically connect the telephones directly to a telephone line. This automatic connection enables the telephones to be used as analog phones and make and receive calls directly without using the PBX server. Power failure is detected by relays which default to a position to connect the telephones directly to the telephone line. The fallback detectors have controller logic which detects the presence of a ringing signal on the telephone line and the failure of the PBX to respond to the ringing signal. In addition, the fallback detectors detect the failure of the PBX to respond when a telephone is used to attempt to make an outgoing call or a call to another one of the local telephones. When the controller logic detects a failure of the PBX server to respond, the controller logic actuates the relays to their default positions.

13 Claims, 5 Drawing Sheets

LAN PHONE SYSTEM WITH AUTOMATIC FALLBACK FOR POWER OR NETWORK FAILURE

This invention relates to a local area network (LAN) telephone system modified to provide emergency telephone service in the case of power failure or LAN processor failure.

BACKGROUND OF THE INVENTION

Figure 1:
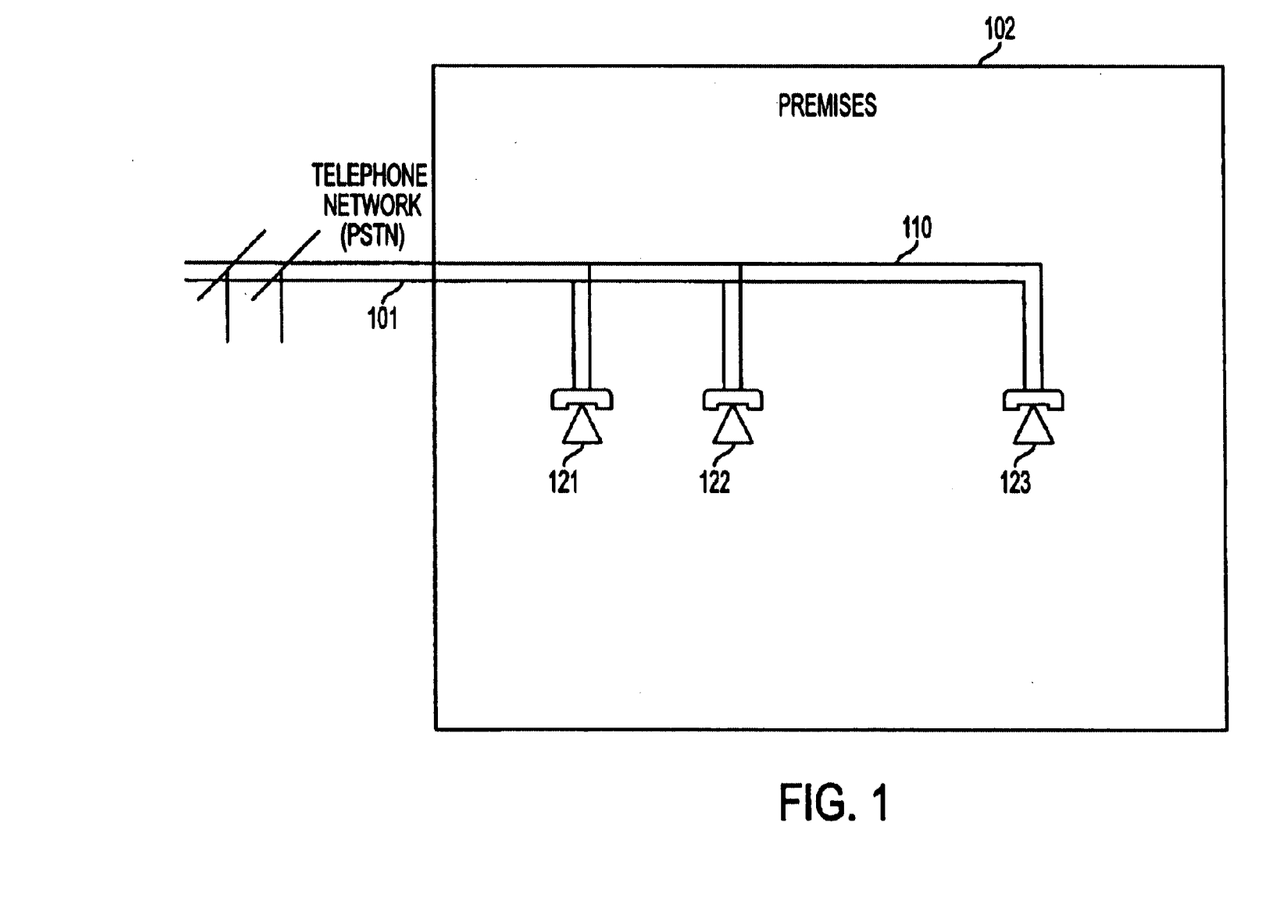
FIG. 1 is a circuit diagram of a conventional analog telephone system.

In a typical analog telephone system used in homes and small businesses, extension phones are connected in parallel across the telephone line conductors. In such a typical system, as shown in FIG. 1, a telephone line 110 comprising a wire pair extends from a public switched telephone network (PSTN) to several conventional analog telephones 121, 122 and 123 within the premises 102 of a home or business. The telephones 121–123 are connected in parallel across the wire pair of the telephone line 110. Power for the analog telephones is supplied by the telephone company on the telephone line from an uninterruptable power source (UPS) and the analog telephones require no other power source. Each of the telephones 121–123 can be used to make a telephone call or receive a telephone call. The system is very reliable and can and does provide uninterrupted telephone service in all but the worst national disasters. The telephone system will remain fully operative in most instances when electric power to the business or home is interrupted. However, the analog telephones 121–123 cannot be used to make calls to each other, cannot be used as an intercom system, and cannot transfer calls or hold calls or perform other functions provided by most modern telephone systems.

Figure 2:
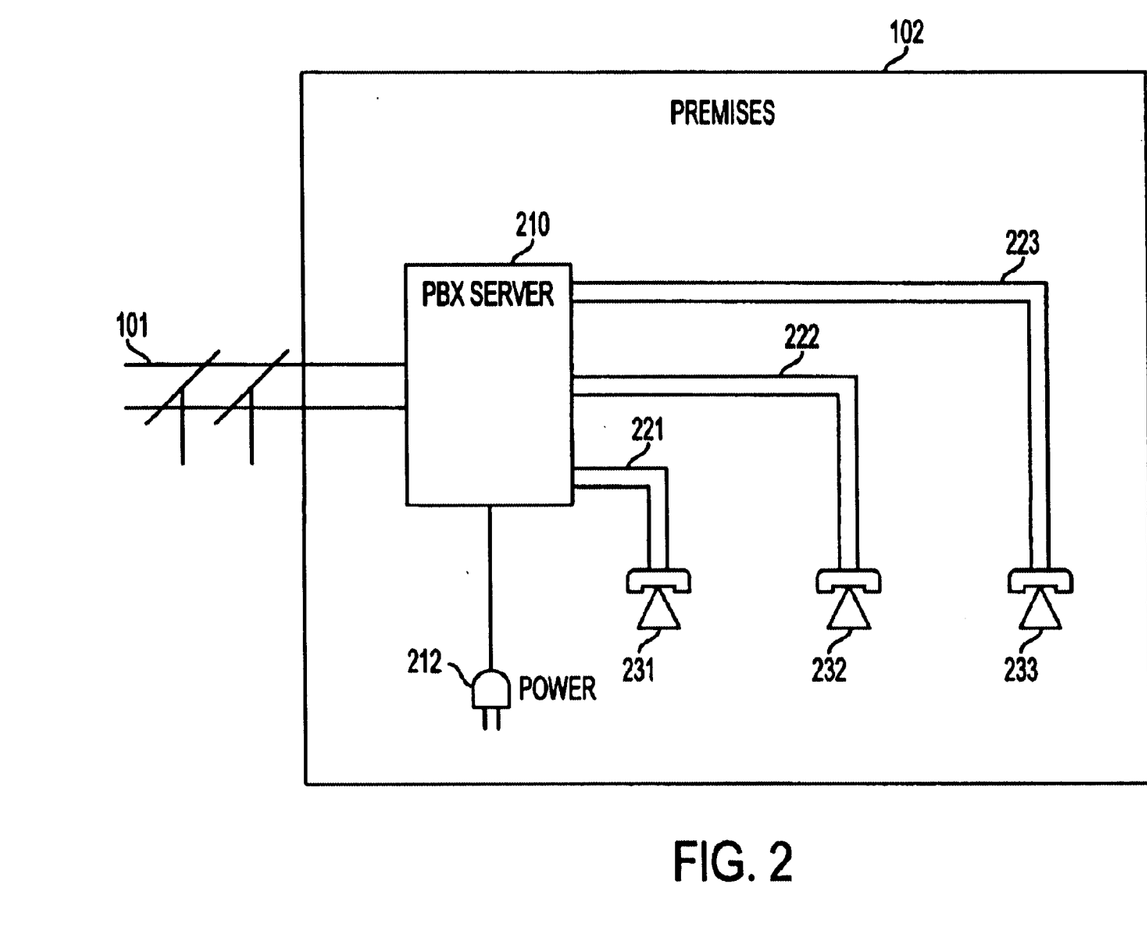
FIG. 2 is a circuit diagram of a typical PBX telephone system.

To increase the functionality of their telephone system, many small businesses and some private homes employ a private branch exchange (PBX) in a system, such as that shown in FIG. 2. In the system of FIG. 2, one or more telephone lines 101 are terminated in a PBX server 210. The PBX server 210 is separately connected by connections 221, 222 and 223 to telephones 231, 232 and 233, respectively. The connections 221, 222 and 223 can be analog or digital, but the connections are point to point, each allowing communication only between the PBX and the corresponding telephone. The configuration of FIG. 2 allows for rich functionality because the PBX server 210 can route incoming calls to any one of the telephones 231–233 as well as let the telephones 231–233 make calls to each other, provide a hold function, provide a forwarding function, provide voice mail and many other modem telephone functions. This configuration, however, has a disadvantage in that the PBX server 210 must be powered from an external power source and if power fails or if the PBX server 210 fails, the phone service for all of the phones is interrupted.

Figure 3:
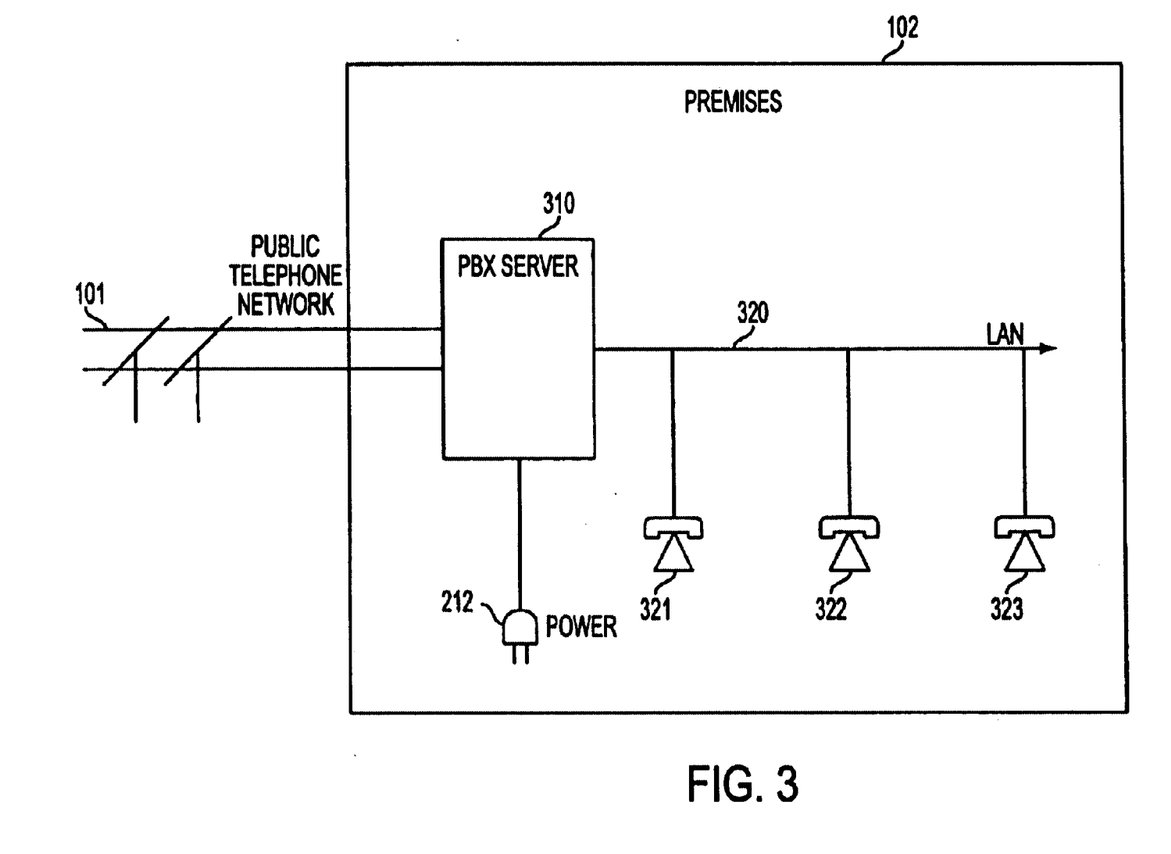
FIG. 3 is a circuit diagram of a typical PBX telephone system employing a LAN to connect to the telephones and telephonic devices of the system.

Another typical PBX system is shown in FIG. 3. In this system, one or more telephone lines 101 is terminated in a PBX server connected to telephones 321, 322 and 323 over a local area network (LAN) 320, which may be a coax cable which is connected in parallel to the telephones 321, 322 and 323. Alternatively, instead of the coax cable, the LAN network may be twisted pairs, such as an Ethernet 10-base T system. In any case, the telephones 321, 322 and 323 are logically connected in parallel and can receive all data and transmit to all other end points on the LAN including transmissions via logically transparent repeaters, hubs, switches and routers. Like the PBX arrangement of FIG. 2, the LAN system in FIG. 3 allows a high degree of functionality and, in addition, provides the capability of having computers connected as end points and permits computers to be used as telephones, telecopiers and answering devices. However, like the PBX server in FIG. 2, the PBX server 310 of the system in FIG. 3 must also receive power from an external source and it is therefore suffers from the same weakness in that service to all of the telephones and other end points can be cut off in the event of power failure or failure of the PBX server.

The above described disadvantages of the systems of FIGS. 2 and 3 are not major problems in large businesses because there, power can be made redundant with UPS devices and, typically, a professional maintenance staff is available. In such large businesses, PBX functions are seen as being indispensable and the businesses willingly trade the lower reliability of the PBX systems for the enhanced telephone systems that they receive from the PBX systems. However, typically, in small businesses and in private homes, there is no maintenance staff and an UPS is an unwanted expense. Accordingly, there is a need for small businesses and private homes for a telephone system which has the features of a PBX system but yet has the reliability of the old fashioned analog telephone system shown in FIG. 1.

SUMMARY OF THE INVENTION

The system of the present invention is implemented in a LAN telephone system in which a PBX is used to route telephone calls to or from telephones or other telephonic devices of the system. In accordance with the invention, fallback adapters are provided to automatically respond to a power failure and also automatically respond to a failure of the PBX. When a power failure occurs or a PBX failure occurs, the fallback adapters directly connect the telephones to a telephone line or telephone lines of the system to enable the telephones to be used as analog phones and make and receive calls directly without using the PBX. Power failure is detected in the fallback adapters by a relay which defaults to a position to connect the telephones directly to the telephone line. In addition, the fallback detectors are provided with controller logic which detect the presence of a ringing signal on the telephone line and the failure of the PBX to respond to the ringing signal. In addition, the fallback detectors detect the failure of the PBX to respond when a telephone is used to attempt to make an outgoing call or a call to another one of the telephones. When detecting a failure of the PBX, the control logic in a fallback detector will actuate the relay in the fallback detector to its fallback positions so as to connect the corresponding telephone directly to the telephone line and allow the telephone to make and receive telephone calls as an analog telephone. In this manner, when a power failure occurs or when the PBX fails in the LAN system, the system is switched to operate in the analog mode and telephone service is maintained even though a power failure or PBX failure has occurred.

PREFERRED EMBODIMENTS OF THE INVENTION

Figure 4:
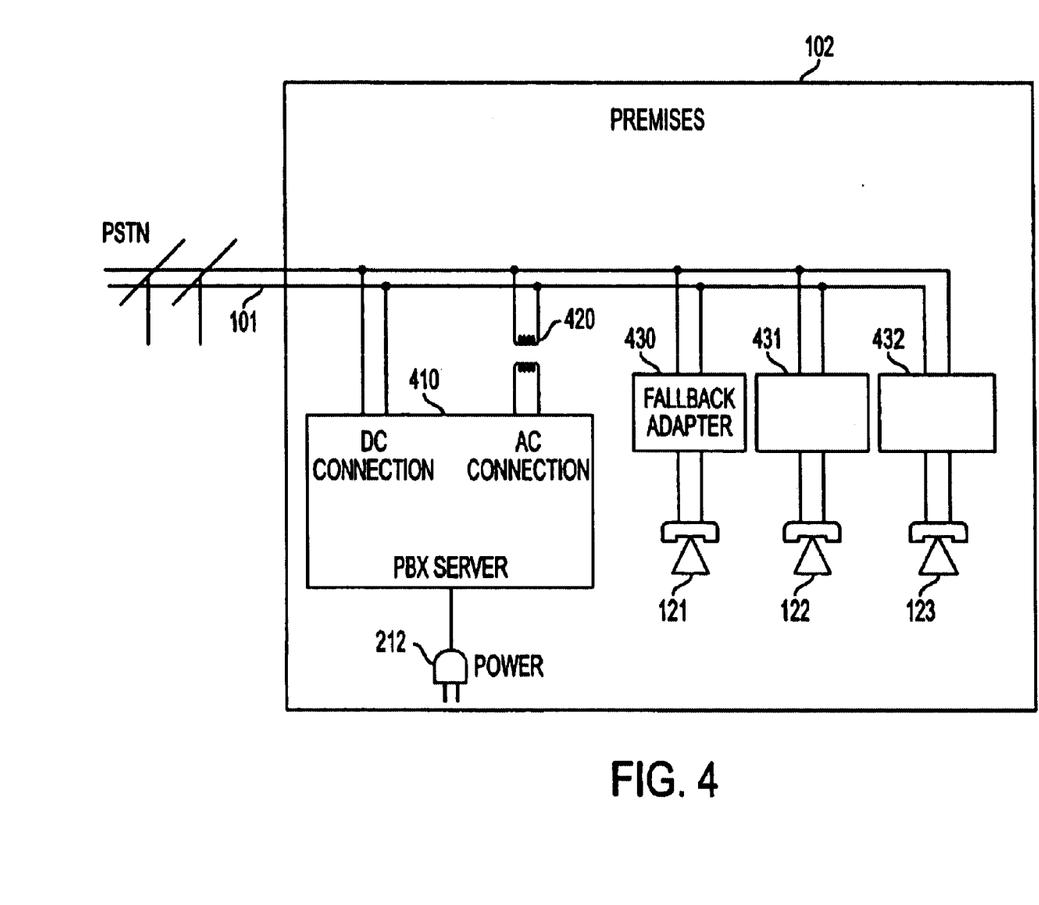
FIG. 4 is a circuit diagram of the system of the present invention.

In the system of the invention as shown in FIG. 4, a telephone line 101 comprising a pair of conductors connects a PSTN to the circuit of the invention within the premises 102 of a business or residence. The system of FIG. 4 is shown with a single telephone line 101, but the invention is readily adaptable to telephone systems employing multiple telephone lines. A direct current connection is provided between the conductors of the telephone line 101 and a PBX server 410 and, in addition, an AC connection is provided between the telephone line 101 and the PBX server through a transformer 420. The telephone line 110 is also connected to fallback adapters 430, 431 and 432, which are connected to desk telephones 121, 122 and 123, respectively. In the specific described embodiment, the telephones are simple analog telephones, and the fallback adapters perform communication functions as well as the fallback functions. Alternatively, the function of the fallback adapters could be incorporated in the desk telephones.

The DC connection between the PBX server 410 and the telephone line 101 allows the PBX server to communicate with the PSTN using conventional analog telephone protocols. The AC connection between the telephone line 101 and the PBX server 410 enables the telephone line 101 to be used as part of a LAN and permits the PBX to communicate with the fallback connectors 430, 431 and 432. In the specific embodiment shown in FIG. 4, AC coded data communications between the PBX and the telephones share the wires of the telephone line 101 within the premises 102 with the PSTN voice and ringing signals. This arrangement requires the AC signals transmitted on the telephone lines 101 to be at a high frequency out of the voice frequency band as is the case with several commercially available PBX LAN systems. Alternatively, a separate connection could be provided between the PBX server and the fallback adapters to provide communication between the PBX server and the adapters.

In the specific embodiment shown in FIG. 4, a ringing signal of an incoming call will be received by the PBX server over the DC connection from the telephone lines and will also be received and detected by the fallback adapters. This ringing signal indicates the presence of an incoming call and, accordingly, is appropriately called an "incoming call signal". If the PBX server 410 is operative, the PBX server will answer the ringing signal and the fallback adapters will not. Upon answering the ringing signal, the PBX server 410 will transmit a message to the fallback adapters indicating that the ringing signal has been received and is being answered by the PBX server. At this time, the PBX server will simulate an off-hook condition to the PSTN by connecting a low impedance across the telephone line. This action will cause the PSTN to terminate the ringing signal. One of the telephones 121, 122 and 123 will be selected to receive the incoming call either through operator action or automatic attendant forwarding and the PBX server 410 will transmit a message through the transformer 420 over the line 110 to the fallback adapters. The transmitted message addresses the fallback adapter corresponding to the telephone selected to receive the incoming call. The fallback adapter corresponding to the selected telephone, in response to the message, will generate and apply a ringing signal to the telephone connected thereto. The fallback adapter will also send a message back to the PBX server 410 indicating that the selected phone is receiving a ringing signal. If the selected telephone goes off hook, this condition is detected by the fallback detector which then sends a message to the PBX server 410 indicating this change in status of the selected telephone. The PBX server and the fallback adapter corresponding to the selected telephone then begin transmitting and receiving digitized signals from each other represented by AC signals transmitted over the telephone line 101. The PBX server will transmit digitized signals representing the voice signal received from the PSTN through the transformer over the telephone line to the fallback adapter connected to the selected telephone and the fallback adapter will convert these signals to audio and transmit them to the selected telephone. The fallback adapter will also convert the voice signals received from the selected telephone and convert them into digital form and transmit the digitized signals as AC signals to the PBX server where they will be converted back to audio and will be transmitted by the server over the DC connection and the telephone lines to the PSTN. When the handset of a telephone 121, 122 or 123 is lifted to make an outgoing call under normal operating conditions, the corresponding fallback adapter detects the change in status of the corresponding telephone to an off-hook status and sends a message to the PBX server 410 indicating this change in status. The PBX server acknowledges receipt of the change in status message and then responds to further messages from the fall-back adapter to make an outgoing call to a remote telephone via the PSTN or to make an internal call to another one of the telephones 121, 122 or 123. In the specific described embodiment, such internal calls are made through the PBX, but the fallback adapters or enhanced desk phones could be provided with the capability of calling each other directly without going through the PBX server.

The PBX server 410 requires externally supplied electric power, supplied from source 212, to operate and in the event of a power tailure, the PBX server will not function and will not respond to incoming telephone calls on line 101 or outgoing calls represented by signals received from the telephones 121–123. The adapters 430–432 also require external power and in the event of a general power failure in the premises 102 will not function to provide communication between the telephones 121–123 and the PBX server 410. However, the adapters 430–432 are each provided with a relay device which has a default position to which it switches when it is not energized as will be the case when there is no external power available. In the default position, the relay device in the adapter 430, 431 or 432 will provide a DC connection between the conductors of the telephone line 101 and the corresponding telephone 121, 122 or 123. As a result, in the case of a general power failure, the telephones 121, 122 and 123 will be directly connected to the PSTN over the telephone line 101. Accordingly, the telephones 121, 122 and 123 will operate to receive and respond to a ringing signal transmitted over the telephone line 101, will transmit dialing signals over the telephone line 101 and will transmit and receive voice and other audio signals over the telephone line 101. With the relay devices of the adapters 430, 431 and 432 in default position, the telephone system of FIG. 4 will operate in exactly the same manner as the system shown in FIG. 1 and telephone calls may be made or received on any one of the telephones 121–123.

If the PBX server 410 should fail to function for a reason other than a general power failure whereby the adapters 430–432 still receive electrical power, the adapters 430–432 will detect the PBX failure and actuate their relay devices to the default position so as to provide a DC connection between the telephones 121–123 and the conductors of the telephone line 101. Accordingly, in the event of failure of the PBX server, each of the telephones 121–123 can make and receive telephone calls in the same manner as the system of FIG. 1.

The fallback adapters detect the failure of the PBX server in the following manner. In the case of an incoming call, an incoming ringing signal will be received on line 101 and this incoming ringing signal which should be received by the PBX server 410 is also received by the fallback adapters. The ringing signal received by the adapters is not immediately passed to the corresponding telephone 121, 122 or 123 unless the relay device of the adapter is already in the default position (as a result of a general power failure). If the PBX server 410 is inoperative, it will not send a message indicating that the PBX server has received the ringing signal and is answering the incoming call. The fallback adapters, in response to receiving an incoming ringing signal which is not followed by a message from the PBX server 410, will actuate their relay devices to the default position to connect the telephones 121–123 directly to the conductors of the telephone line 101. Thus, as a ringing signal continues on the telephone line 101, the continued ringing signal will be transmitted to the telephones 121–123 to a actuate the acoustic ringer in these telephones. Any one of the telephones may then be taken off hook to receive the telephone call and make voice communications over the telephone line 101 to the remote calling telephone through the PSTN.

When the PBX server 410 has failed and an outgoing telephone call is attempted from one of the telephones, the failure of the PBX server 410 will also be detected by the fallback adapters. In normal operation with the PBX server operating, the caller would lift the handset of the desk phone and this action would be detected by the corresponding fallback adapter which would send a message indicating this change in status to the PBX server 410. When the PBX server 410 is not operating, the PBX server 410 will not return an acknowledgment message to the fallback adapter in response to the fallback adapter message indicating the change in status of the corresponding telephone. The fallback adapter will respond to the failure of the PBX server to transmit an acknowledgment message within a predetermined time interval and actuate its relay device to the default position to provide a DC connection between the corresponding telephone and the telephone line 101. As a result, the connected telephone will draw current from the telephone lines which will be detected by the PSTN and will transmit a dial tone to the connected one of the telephones 121–123. The telephone will then be able to make an outgoing call in the manner of a conventional analog telephone by transmitting dialing signals to the PSTN which will then make a connection to a remote telephone receiver in response to the dialing signals.

In the preferred embodiment, the other fallback detectors will also detect the message indicating the change in status of the telephone which went off hook followed by the failure of the PBX server to respond to this message, and, in response to this sequence of events, will actuate the relay devices in the fallback adapters to the default position so that all of the telephones 121–123 become directly connected to the conductors of the telephone line 101 when the PBX server fails to respond to one of the telephones 121–123 going off hook.

Figure 5:
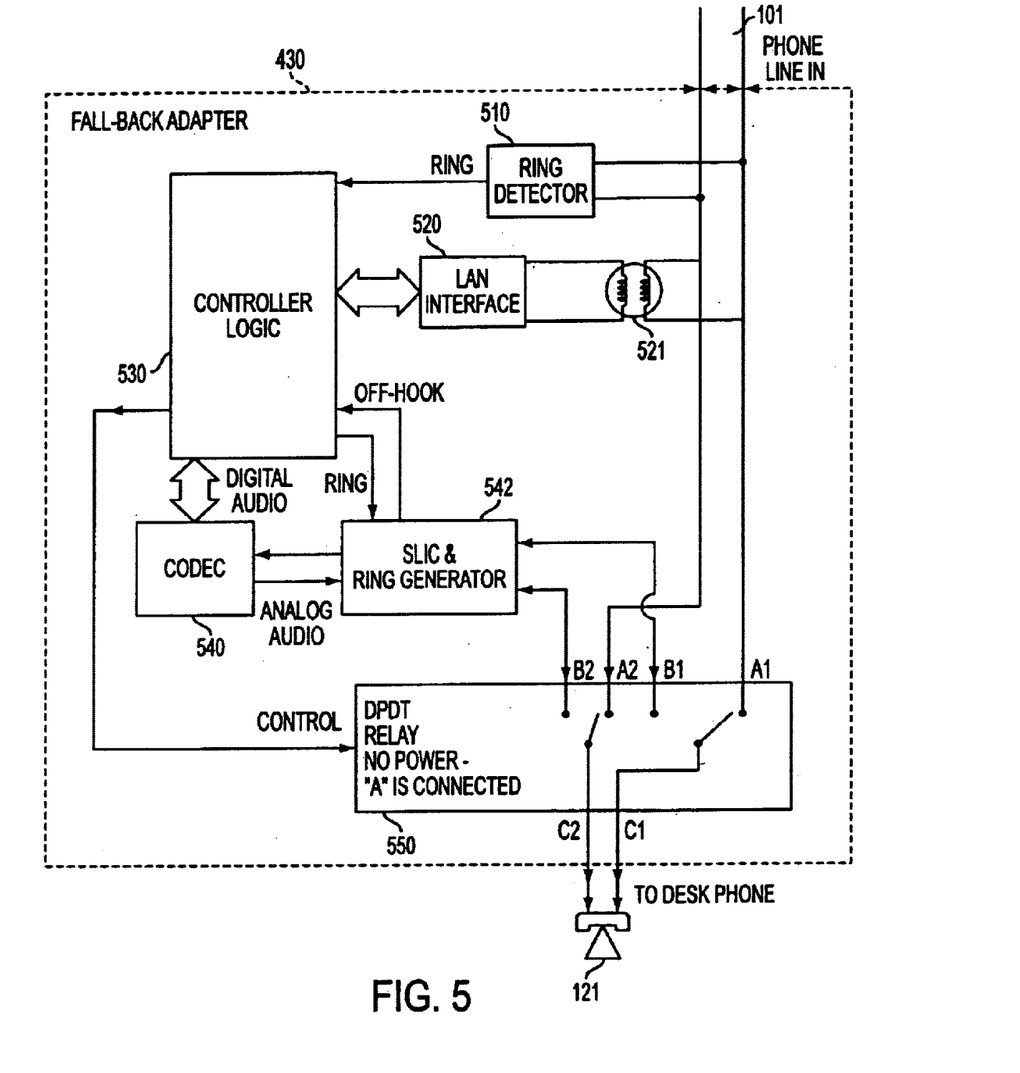
FIG. 5 is a diagram of a fallback detector employed in the system of FIG. 5.

FIG. 5 shows the details if the circuitry of the fallback adapter 430, it being understood that the fallback adapters 431 and 432 have identical circuits and operate in the same manner. The fallback adapter 430 comprises a ring detector 510 which is connected directly to the conductors of the telephone line 101 and, in response to receiving a ringing signal over the telephone line 101, will apply a ring signal to controller logic 530 indicating that a ringing signal has been received. The telephone lines 101 are also connected through a transformer 521 to a LAN interface 520. A high frequency digitized signal applied to the telephone lines 101 by the PBX server 410 through the transformer 420 will be transmitted through the transformer 521 to the LAN interface 520 where the high frequency digitized signals will be converted to digital signals in a form compatible with the controller logic 530. The controller logic 530 will apply digital signals to the LAN interface 520 which converts the digital signals to AC digitized signals which are transmitted through the transformer 521 to the telephone line 101 and through the telephone line 101 to the PBX server 410 through the transformer 420. The PBX server 410 and the fallback adapters 430, 431 and 432 communicate with each other in data packets to transmit both messages and audio signals. Each data packet will have an address indicating the recipient for the data packet, the recipient being either the PBX server 410 or one of the fallback adapters.

The controller logic 530 is connected to transmit to and receive digitized audio signals from a coder-decoder unit 540, known as a codec. The codec 540 is connected to receive signals from and transmit audio signals to a subscriber line interface circuit (SLIC) 542. The codec 540 converts audio signals received from the SLIC 542 to digital and transmits them to the controller logic 530. Similarly, the codec 540 receives digital signals from the controller logic 530 representing audio signals, converts the digital to audio signals, and transmits the corresponding audio signals to the SLIC 542. The SLIC 542 applies the audio signal received from the telephone 121 to the codec 540 and applies the analog signals received from the codec 540 to the telephone 121 over the contacts B1 and B2 of a relay device 550 when the relay device 550 is in its active position. The SLIC 542 detects when the telephone 121 goes to or is in an off-hook position, which is the condition it will be in when the handset is lifted from the telephone. The SLIC 542 signals the on- or off-hook condition to the controller logic 530.

The conductors of the telephone line 101 are connected to contacts A1 and A2 of the relay device 550, which is a double pole, double throw (DPDT) relay. The relay 550 has a default position in which it connects telephone 121 to the conductors of the telephone line 101 through the contacts A1 and A2. The relay 550 has an active position in which it connects the telephone 121 through contacts B1 and B2 to the SLIC 542. The relay 550 is connected to be energized by power from the external power source and when no electric power is received by the adapter, the contacts of the relay 550 will be switched to the default position in which the telephone 121 is directly connected to the conductors of the telephone line 101. When there is power and the controller logic 530 has not detected that the PBX server has failed, the relay 550 connects the telephone 121 through the contacts B1 and B2 to the SLIC 542. When the controller logic 530 detects that the PBX server 410 has failed, the controller logic 530 will apply a control signal to the relay 550 forcing it to its default position and connecting the telephone 121 directly to the conductors of telephone line 101. As indicated above, the relay device 550 device is implemented by DPDT relay. Alternatively, the relay devices could be implemented by electronic switching devices having the capability of providing directing current connections between the telephones and the telephone lines.

Under normal operation, with external power provided and with the PBX server 410 operational, an incoming call is handled as follows. The ringing signal will be received by the PBX server 410 over the DC connection and, in response to receiving the ringing signal, the server 410 will transmit a data packet to fallback adapters 430, 431 and 432. The data packet will be a message indicating the fact that the PBX server has received and is responding to the ringing signal. In response to this data packet, the controller logic 530 will go to a waiting state to await a further data packets indicating which of the telephones 121, 122 and 123 is to receive the call. The PBX server 410 will then transmit a data packet to the fallback adapters 430,431 and 432 selecting one of the telephones 121–123 to receive the call. If the telephone 121 is selected, controller logic 530 in the fallback adapter 430 examines the on-hook or off-hook status of the telephone 121 from the signal applied to the controller logic 530 by the SLIC 542. If the telephone 121 is on hook, the controller logic 530 will apply a signal to the SLIC 542, calling for the telephone 11 to be rung. In response to this signal, the SLIC will generate a ringing signal which is applied over the contacts B1 and B2 of the relay 550 to the telephone 121 where the ringing signal is applied to the acoustic ring generator of the telephone 121 to cause it to produce the ringing sound. The controller logic 530, in response to a detected on-hook condition of the telephone 121, will also send a data packet to the PBX server indicating that the telephone 121 is being rung. In response to receiving this data packet, the PBX server 410 will generate a ringing tone which is transmitted via the DC connection to the telephone line 101 and over the telephone line 101 to the PSTN, where the ringing tone will be routed by the PSTN to the remote calling telephone. If the telephone 121 is off-hook when the controller logic 530 examines the on or off-hook status of the telephone 121 as indicated by the SLIC 542, the controller logic 530 will return a data packet to the PBX 410 indicating the off-hook condition of the telephone 121. If the PBX server 410 receives a data packet from the fallback adapter 430 indicating that the telephone 121 is off hook, the PBX server 410 will transmit a message or signal back to the remote calling telephone indicating that the selected extension is busy. Alternatively, the PBX server may switch the incoming call to a voice mail system.

If, after receiving the ringing signal, the telephone 121 is answered whereby the telephone 121 goes off hook, this off-hook condition will be detected by the SLIC which will then transmit an off-hook signal to the controller logic 530. The controller logic 530 will then transmit a data packet to the PBX 410 indicating that the telephone 121 has gone off hook. In response to receiving this data packet indicating that the telephone 121 has gone off hook after receiving the data packet indicating the telephone 121 is being rung, the PBX server 410 will begin converting any audio signal or voice signal received through the DC connection from line 101 to digital and transmit data packets containing the digital signals to the controller logic 530 in the fallback adapter 430. The digital signals representing the voice or audio on the telephone line 101 will be routed to the codec 540 by the controller logic 530 where these digital signals will be converted to audio and applied via the SLIC 542 to the telephone 121. The speaker in the telephone 121 will convert the received audio signal to sound. At the same time, audio signals generated by the microphone in the telephone 121 will be transmitted via the SLIC 542 to the codec 540 which will convert the signals to digital and apply the digital signals to the controller logic 530. The controller logic 530 will transmit the digital signals in data packets to the PBX 410 where the digital signals will be converted to audio signals and applied to the telephone line 101 by the DC connection between the PBX server 410 and the telephone line. In this manner, voice communication between the telephone 121 and the remote calling telephone takes place.

In one embodiment of the invention, if the controller logic 530, after receiving the ring signal from the ring detector 510, does not receive immediately thereafter a data packet from the PBX server 410 acknowledging receipt of the ringing signal by the PBX server 410, the PBX server will have failed. The controller logic 530 detects this sequence (a ring signal followed by a predetermined short interval in which no acknowledging data packet is received) as a failure of the PBX server and applies a signal to the relay 550 to cause it to switch to the default position. As a result, the telephone 121 is directly connected to the conductors of the telephone line 101 over contacts A1 and A2. The telephone 121 will then receive the ringing signal directly from the telephone line 101. If the handset is then lifted from the telephone 121, voice communication with the calling party will commence as in conventional telephone systems like that shown in FIG. 1.

In an alternative embodiment of the invention, the fallback adapter, instead of detecting failure of the PBX server by the failure of the PBX server to immediately send an acknowledging data packet following the receipt of the incoming call signal or ringing signal, detects the failure of the PBX server by the failure of the PBX server to send the acknowledging data packet within a predetermined number of rings in the incoming call signal. In a conventional telephone system, the incoming call signal comprises a series of spaced AC voltage pulses, called rings. These AC voltages when applied to an analog telephone will cause then sound transducer in the analog telephone to generate an audible ringing tone. In the alternative arrangement, the controller logic 530 counts the number of rings of an incoming call signal and when this count reaches a predetermined number without the receipt of a data packet from the PBX server acknowledging receipt of the incoming call signal, the controller logic 530 detects that the PBX server has failed and actuates the relay 550 to its default position whereupon additional rings in the incoming call signal will be transmitted to the corresponding analog telephone 121 and cause the acoustic transducer to ring.

An outgoing call is initiated from the telephone 121 by the handset being lifted causing the telephone to go to an off-hook state. When the telephone 121 goes to an off-hook state, with the relay 550 in the active position connecting the telephone to the SLIC 542, the SLIC will assert an off-hook signal to the controller logic 530. The controller logic 530, in response to receiving the off-hook signal, will send a data packet to the PBX server 410 indicating the change to the off-hook condition of the telephone 121. If the PBX server is operative, the PBX server, in response to receiving the data packet indicating the telephone 121 has gone off hook, responds by sending back a data packet acknowledging receipt of the data packet indicating the off-hook state of the telephone 121. The controller logic 530, in response to receiving the acknowledgment data packet from the PBX server, generates digital signals representing a dial tone which digital signals are converted to audio by the codec 540 and applied via the SLIC 542 to the telephone 121. The controller logic 530 then monitors the digital signals from the codec 540. Assuming that the user of the telephone 121 starts dialing to place a phone call, the dialing signals generated by the telephone 121 are transmitted by the SLIC 542 to the codec 540 where the audio dialing signals are converted to digital signals and the digital signals are transmitted to the controller logic 530. The dialing signals may be dual tone multiple frequency (DTMF) signals. The controller logic 530 detects the presence of the dialing signals in the received digital signals from the codec 540, and, in response to each dialing signal, transmits a data packet to the PBX server 410 indicating the dialed character represented by the dialing signal. The PBX server 410, in response to the receipt of data packets representing the dialing signals, responds to the received data packets to place outgoing calls by transmitting the corresponding dialing signals over the telephone lines to the PSTN or, alternatively, selects one of the other telephones 122 or 123 to receive an internally placed call. In a typical PBX server, a user places an outgoing call by first dialing 9 and the PBX server 410 in response to receiving a data packet representing "9" as the first dialed digit will transmit subsequent dialed digits as dialing signals over the DC connection and the telephone line to the PSTN to place the call to a remote telephone.

In the absence of a first dialed digit being a 9, the PBX server will respond to the received data packets representing dialing signals to select telephone 121 or 122 via a fallback adapter to receive the telephone call. After the call has been placed by the PBX server 410 to a remote telephone, the PSTN will ring the remote telephone and will return a ringing tone to the PBX server 410. The PBX server 410 will convert the received ringing tone to digital and transmit these digital signals in the form of data packets to the fallback adapter 410 where the digital signals will be routed by the controller logic 530 to the codec 540, which will convert the digital signals to audio and apply them to the telephone 121. The audio signals will then be converted to sound by the speaker in the telephone 121. If the remote telephone then goes off hook, a telephone connection will be effective between the telephone 121 and the remote telephone and the user of the telephone 121 can carry out a voice conversation with the user of the telephone 121 and the telephone line 101 in the same manner as in an incoming call.

If the telephone call is a local call, the PBX server in response to the received dialing signals will transmit a data packet over the telephone line 101 to select one of the fallback adapters 431 or 432 to receive the call. The controller logic 530 in the selected fallback adapter will control the codec and the SLIC to ring the selected phone and transmit voice signals between the PBX 410 and the selected phone in the same manner as described above for an incoming call from a remote telephone. In this case, however, the data packets transmitted to the selected fallback adapter 431 or 432 will correspond to data packets received from the fallback adapter 430 representing audio generated by the microphone in the telephone 121. Likewise, the PBX server 410, instead of converting the received data packets from the selected fallback adapter 431 or 432 to audio, re-transmits these data packets addressed to the fallback adapter 430 where they will be converted to audio and generate sound at the speaker of the telephone 121.

The controller logic 530, instead of distinguishing between dialing signals and voice signals and sending data packets representing the detected dialing signals to the PBX server, could simply transmit the digitized voice signals and dialing signals to the PBX server and the PBX server could be employed to distinguish between the dialing signals and the voice signals and make the decisions as to which received data represents dialing signals and which data represents voice signals or another form of audio signals.

When the telephone 121 is hung up, this status is detected by the SLIC 542 which then terminates the off-hook signal to the controller logic 530. The controller logic 530 will then transmit a data packet to the PBX server 410 indicating that the telephone 121 has gone on hook. In response to receiving this data packet, the PBX server 410 will disconnect the impedance from the DC connection to the telephone line 101 to simulate the on-hook condition. The PBX server 410 will then cease drawing current from the telephone line 101, which action will signal the PSTN that a hang up has occurred.

If the PBX server 410 does not respond with an acknowledgment data packet to the controller logic in response to receiving a data packet from the controller logic 530 indicating that the telephone 121 has gone to an off-hook condition, it will be assumed that the PBX server is inoperative. In response to the failure to receive the acknowledgment data packet within a predetermined short time interval following the transmittal of the data packet indicating a change in status of the telephone 121 to the off-hook condition, the controller logic 530 will apply a signal to the relay 550 to force it to its default position in which it provides a DC connection by contacts A1 and A2 to the conductors of the telephone line 101. In a similar manner, the other fallback detectors 431 and 432 will monitor the transmission of the data packet from the fallback detector 430 indicating a change of status of the telephone 121 of the off hook condition. When such a change of status data packet has been transmitted and the PBX server fails to respond immediately with an acknowledgment data packet, the fallback adapters 431 and 432 will also force their relays to the default position and provide a DC connection between the telephones 122 and 123 and the conductors of the telephone line 101.

Thus, in the system as described above, the telephones 121, 122 and 123 will each be connected to the telephone line 101 in the event of a general power failure and also be connected to the line 101 by a DC connection in response to a failure of the PBX 410 to operate. In this manner, in the case of a power failure or in the case of failure of the PBX server 410, a fallback analog telephone service is provided.

In the system as described above, the LAN will not be fully occupied during the time it is being used to transmit voice traffic. Accordingly, other information, such as input from special service buttons on the phone, such as hold, mute, read voice mail, or start audio recording, can be received by the controller logic and transmitted to the PBX server. In addition, other information, such as time of call, caller ID, etc., can also be passed from the PBX server to the desk phones.

The above described specific embodiment shows a system used with a simple analog desk phone with only voice capability. However, other devices can be connected to the system in place of the desk phone, such as, for example, video phones or a personal computer could be connected to the system and receive richer communications, such as video or data. Because the transmission of voice and other information is transmitted in a digitized form over the LAN between the PBX and the fallback adapters, the LAN can be used simultaneously to transmit many conversations as well as being used simultaneously for traditional data traffic between computers, printers, etc.

The PBX server could be implemented as software on a personal computer. Similarly, the fallback adapters could be implemented as software on personal computers. As a still further alternative, a dedicated PBX server could be eliminated from the system wherein each computer acting as a fallback adapter would have the ability to act as a server.

Such an arrangement would be quite robust with respect to server failure. In such a system, an incoming call ringing signal would be noted by all the fallback adapters and the fallback adapters would communicate via the LAN. An arbitration system would decide which fallback adapter would act as the PBX server. The arbitration could be static with preassigned priority numbers or it could be any number of adaptive schemes commonly used. Once one of the fallback adapters started acting as the PBX server for a call, the other fallback adapters would revert to a fallback adapter mode as the call proceeded. Operation would then proceed as described above in connection with FIGS. 4 and 5 to manage incoming and outgoing telephone calls. While to provide such a flexibility would most easily be accomplished by using a personal computer for each fallback adaptor, such flexible capability could also be provided in the form of a super answering machine/PBX/adapter provided with specialized logic and programmed microprocessors.

The above description is of preferred embodiments of the invention and modification may be made thereto without departing from the spirit and scope of the invention which is defined in the appended claims.

What is claimed is:

1. A telephone system comprising a plurality of telephones, a PBX server connected to said telephones and operable to route telephone calls between said telephones and remote telephones over a telephone line via a public switched telephone network, a fallback adapter connected to at least one of said telephones, said fallback adapter comprising a relay device having an active position and a default position, said relay device being connected to an external power source and normally being maintained in said active position when power from said external power source is present and switching to said default position when power from said external power source is not present, said relay device providing a direct current connection between said one of said telephones and said telephone line when said relay device is in said default position, said fallback adapter having an incoming call signal detector to detect the presence of an incoming call signal on said telephone line, and controller logic responsive to the detection of an incoming call signal on said telephone line by said incoming call signal detector followed by a failure of said PBX server to respond to said incoming call signal to cause said relay device to switch to said default position.

2. A telephone system as recited in claim 1, wherein said controller logic is responsive to the failure of said PBX server to respond to one of said telephones going to an off-hook state to cause said relay device to switch to said default position.

3. A telephone system as recited in claim 2, wherein each of said telephones connected to said PBX server has a fallback adapter as recited in claim 2.

4. A telephone system as recited in claim 1, wherein each of said telephones connected to said PBX server has a fallback adapter as recited in claim 1.

5. A telephone system as recited in claim 3, wherein said PBX server and the fallback adapters connected to each of said telephones and the connection between said PBX server and the telephones comprises a local area network, said PBX server routing an incoming telephone call to a selected one of said telephones by means of said local area network.

6. A telephone system as recited in claim 5, wherein said PBX server transmits a message to said fallback adapters acknowledging receipt of an incoming call signal on said telephone line, said controller logic in each of said fallback adapters detecting the failure of said PBX server to transmit said message acknowledging receipt of an incoming call signal to actuate the relay device of the corresponding fallback detector to the default position.

7. A telephone system as recited in claim 6, wherein said PBX server transmits said message acknowledging the receipt of an incoming call signal in AC digitized signals over said telephone lines to said fallback adapters.

8. A telephone system as recited in claim 1, wherein said relay device comprises a relay having said active and default positions and being connected to be energized by said power source to be maintained in said active position when power from said power source is present, said relay having electrical contacts to provide said direct current connections between said one of said telephones and said telephone line when said relay is in said default position.

9. A telephone system as recited in claim 1, wherein said incoming call signal comprises a sequence of rings, said controller logic counting the number of rings in said incoming call signal and when the number of rings in said incoming call reaches a predetermined number causing said relay device to switch to said default position.

10. A telephone system comprising a plurality of telephones, a PBX server connected to said telephones and operable to route telephone calls between said telephones and remote telephones over a telephone line via a public switched telephone network, a fallback adapter connected to at least one of said telephones, said fallback adapter comprising a relay device having an active position and a default position, said relay device providing a direct current connection between said one of said telephones and said telephone line when said relay device is in said default position, said fallback adapter having an incoming call signal detector to detect the presence of an incoming call signal on said telephone line, and controller logic responsive to the detection of an incoming call signal on said telephone line by said incoming call signal detector followed by the failure of said PBX server to respond to said incoming call signal to cause said relay device to switch to said default position.

11. A telephone system as recited in claim 10, wherein said controller logic is responsive to the failure of said PBX server to respond to one of said telephones going to an off-hook state to cause said relay device to switch to said default position.

12. A telephone system comprising a plurality of telephones, a PBX server connected to said telephones and operable to route telephone calls between said telephones and remote telephones over a telephone line via a public switched telephone network, a fallback connector connected to at least one of said telephones, said fallback adapter comprising a relay device having an active position and a default position, a circuit in said fallback adapter detecting when one of said telephones goes off-hook, controller logic in said fallback detector responsive to the detection by said circuit of said one of said telephones going off-hook to transmit a message to said PBX server indicating the change of state of said one of said telephones to an off-hook condition, said PBX server being operable to transmit a second message to said fallback adapter acknowledging receipt by said PBX server of said first message, said controller logic being responsive to the failure of said PBX server to send said second message within a predetermined time interval following the transmission of said first message to said PBX server to cause said relay device to switch to said default position.

13. A telephone system as recited in claim 12, wherein said relay device comprises a relay having said active and default positions and being connected to be energized from an external power source, and is normally held in said active position when power from said external power source is present and switching to said default position when power from said external power source is not present.

* * * * *